US012693815B2

(12) United States Patent
Ishii

(10) Patent No.: US 12,693,815 B2
(45) Date of Patent: Jul. 28, 2026

(54) PRINTER HAVING OFF-LINE PRINTING, METHOD OF CONTROLLING PRINTER, AND STORAGE MEDIUM

(71) Applicant: CANON KABUSHIKI KAISHA, Tokyo (JP)

(72) Inventor: Ayuko Ishii, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 64 days.

(21) Appl. No.: 18/411,211

(22) Filed: Jan. 12, 2024

(65) Prior Publication Data

US 2024/0256191 A1     Aug. 1, 2024

(30) Foreign Application Priority Data

Jan. 31, 2023     (JP) ................................. 2023-013591

(51) Int. Cl.
*G06F 3/12* (2006.01)

(52) U.S. Cl.
CPC ............ *G06F 3/121* (2013.01); *G06F 3/1239* (2013.01); *G06F 3/1253* (2013.01); *G06F 3/1288* (2013.01)

(58) Field of Classification Search
CPC ...... G06F 3/121; G06F 3/1239; G06F 3/1253; G06F 3/1288
See application file for complete search history.

(56) References Cited

U.S. PATENT DOCUMENTS

| | | | | |
|---|---|---|---|---|
| 2002/0097429 A1* | 7/2002 | Ferlitsch | ............... | G06F 3/1273 |
| | | | | 358/1.14 |
| 2010/0118334 A1* | 5/2010 | Iwase | .................... | G06F 3/1204 |
| | | | | 358/1.15 |
| 2021/0303234 A1* | 9/2021 | Fukusada | .............. | G06F 3/1285 |
| 2021/0306516 A1* | 9/2021 | Yamada | ................. | H04N 1/346 |
| 2022/0229612 A1* | 7/2022 | Hosomizo | ........... | H04N 1/4413 |
| 2022/0229614 A1* | 7/2022 | Hosomizo | ............. | G06F 3/1207 |
| 2022/0283765 A1* | 9/2022 | Yasui | .................... | G06F 3/1273 |
| 2022/0291619 A1* | 9/2022 | Sahara | .................. | G06F 3/1236 |
| 2023/0032333 A1* | 2/2023 | Nakanishi | ............. | G06F 3/1236 |
| 2024/0220170 A1* | 7/2024 | Okuno | ................... | G06Q 20/42 |

FOREIGN PATENT DOCUMENTS

JP          2012-160203 A       8/2012

* cited by examiner

*Primary Examiner* — Nicholas Pachol
(74) *Attorney, Agent, or Firm* — VENABLE LLP

(57) ABSTRACT

A printer capable of being used under a predetermined contract by communicating with a server determines whether the printer is in a state of being capable of communicating with the server, manages information indicating that a warning has been made, with the printer being notified of the warning in a case where a remaining printable page count in a particular period determined based on the predetermined contract falls below a predetermined value, and decides whether to execute or prohibit a print operation corresponding to an input print job. The print operation corresponding to the print job is prohibited in a case where it is determined that the printer is not in the state of being capable of communicating with the server, and the warning has been made.

10 Claims, 6 Drawing Sheets

PRINTER HAVING OFF-LINE PRINTING, METHOD OF CONTROLLING PRINTER, AND STORAGE MEDIUM

BACKGROUND OF THE INVENTION

Field of the Invention

The present invention relates to a printer used in a subscription service, a method of controlling a printer, and a storage medium.

Description of the Related Art

In recent years, printer subscription services have been becoming popular. Such a subscription service is implemented by communication between a server and the printer. Specifically, the server holds the contents of contracts and determines the number of pages the printer can print or the like, while the printer queries the server to activate a contract and performs communication such as sending a log to the server after executing printing.

The above assumes an environment in which the printer can be always connected to the server. Hence, there is a possibility of affecting the service in a case where the connection is lost for a long period of time. Normally, in the case where the printer is disconnected from the server, it will be difficult to provide the service, but immediately stopping the service will impair the convenience for the user. To address this, "limited offline page count" is usually set to allow a certain number of pages to be printed even after falling into a state of being disconnected from the server (hereinafter referred to as "offline").

Japanese Patent Laid-Open No. 2012-160203 discloses a method in which a higher limit offline page count is applied for offline printing, and the number of pages printed offline is managed with single-sided printing and double-sided printing distinguished such that two pages are counted as printed in a case where double-sided printing is performed.

Note that the higher limit offline page count is a higher limit page count that is collectively applied during the offline state, and is a value independent of the remaining number of pages available for printing until a higher limit page count in a contract is reached. Thus, in a case where the remaining number of pages available for printing in a contracted plan is low, there is a possibility that performing printing offline may exceed the remaining number of pages available for printing in the contracted plan. For this reason, the method of Japanese Patent Laid-Open No. 2012-160203 applies a strict method to the incrementation of a counter for the higher limit offline page count during the offline state, but there is still a possibility of exceeding the number of pages available for printing in the contracted plan, and the user may therefore unintentionally print pages more than the higher limit page count.

SUMMARY OF THE INVENTION

In view of the above, the present invention provides a printer, a method of controlling a printer, and a storage medium which are capable of keeping a user from unintentionally printing pages more than a higher limit page count in a contract during an offline state.

A printer of the present invention is a printer capable of being used under a predetermined contract by communicating with a server, the printer including: a determination unit that determines whether the printer is in a state of being capable of communicating with the server; a management unit that manages information indicating that a warning has been made, the printer being notified of the warning in a case where a remaining printable page count in a particular period determined based on the predetermined contract falls below a predetermined value; and a decision unit that decides whether to execute or prohibit a print operation corresponding to an input print job, in which the decision unit prohibits the print operation corresponding to the print job in a case where the determination unit determines that the printer is not in the state of being capable of communicating with the server, and the management unit is holding the information indicating that the warning has been made.

According to the present invention, it is possible to provide a printer, a method of controlling a printer, and a storage medium which are capable of keeping a user from unintentionally printing pages more than a higher limit page count in a contract during an offline state.

Further features of the present invention will become apparent from the following description of exemplary embodiments with reference to the attached drawings.

DESCRIPTION OF THE EMBODIMENTS

An embodiment of the present invention will be described below with reference to the drawings.

Figure 1:
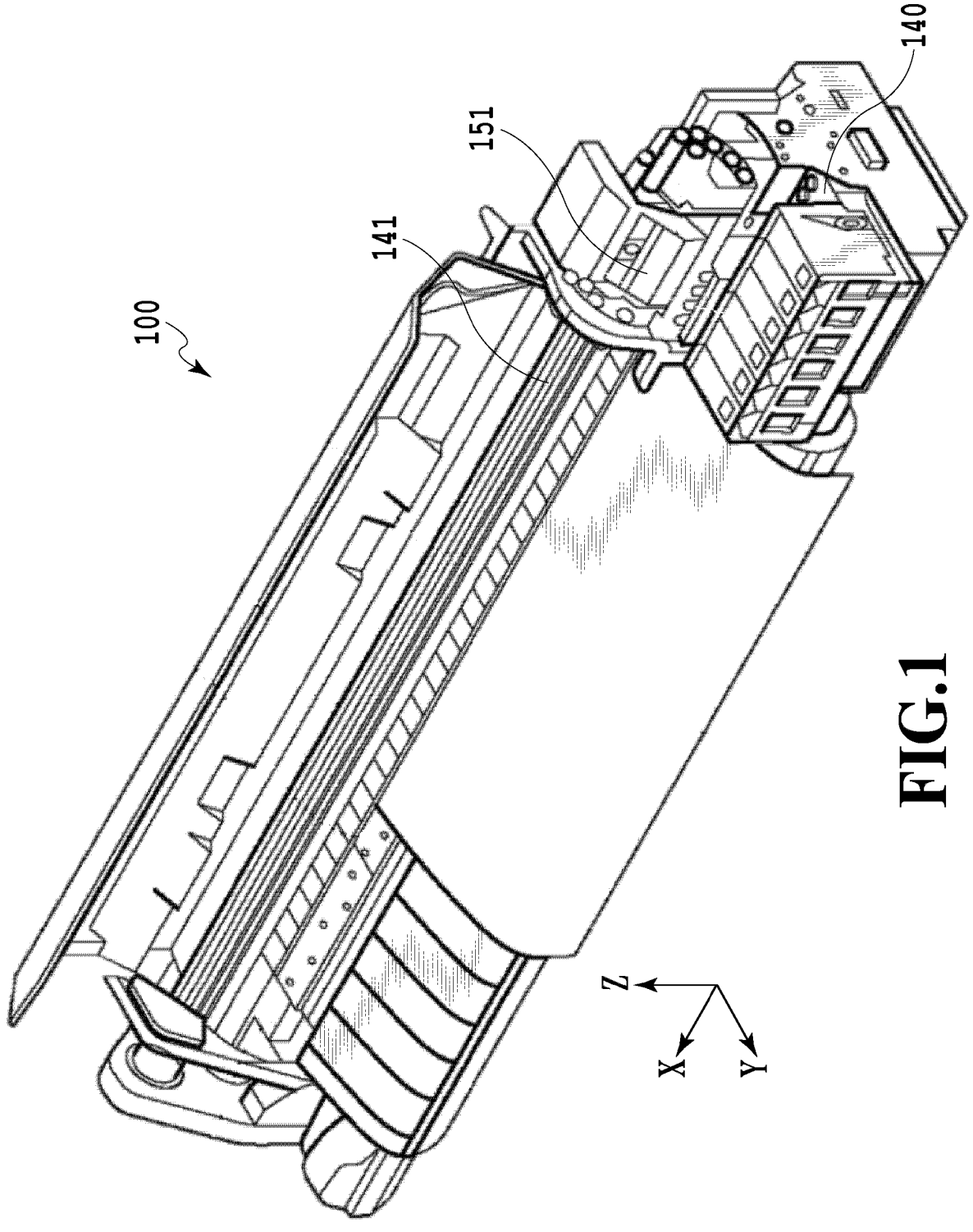
FIG. 1 is an exterior view illustrating a printer.

FIG. 1 is an exterior view of a printer 100 to which the present embodiment is applicable. In the printer 100, a pair of guide rails 141 are disposed which extend in a main-scanning direction and are provided parallel to each other. A carriage 140 carrying an ink-jet head 151 for ejecting liquids (hereinafter referred to also as "inks") is disposed on the guide rails so as to be capable of being scanned over a print medium in the X direction, which is the main-scanning direction. A conveyance unit of the printer 100 conveys the print medium in the Y direction, which is the conveyance direction.

Figure 2:
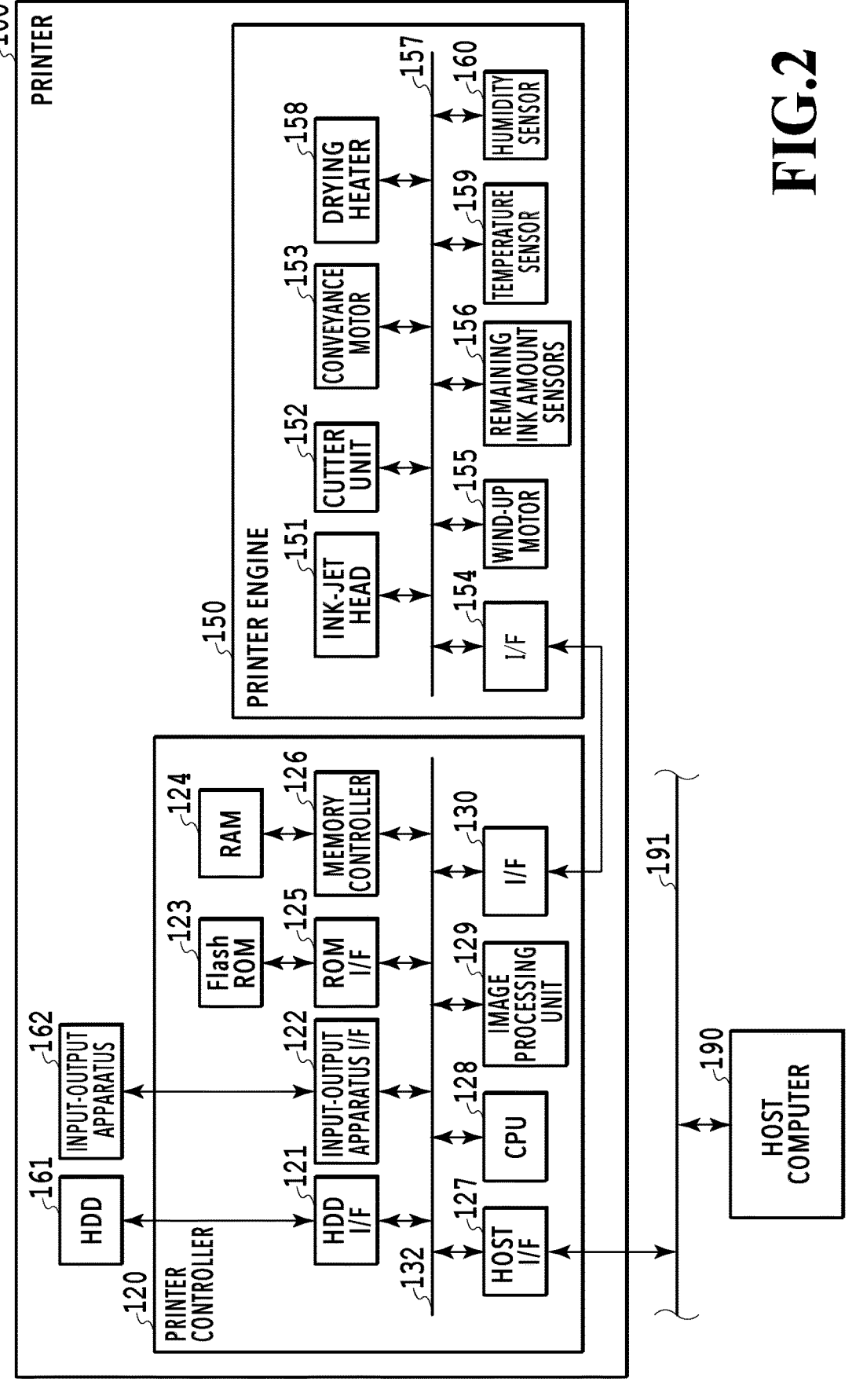
FIG. 2 is a block diagram illustrating a configuration of the printer.

FIG. 2 is a block diagram illustrating a configuration of the printer 100 in the present embodiment connected to a host computer 190. Although the printer 100 illustrated in FIG. 2 only has a printing function, the printer 100 is not limited to this, and may be one further including a reading apparatus that reads an image on a document to function as a copier, or a multi-function peripheral having other additional functions.

The printer 100 has a printer controller 120, a printer engine 150, a hard disk drive (HDD) 161, and an input-output apparatus 162. The printer 100 is capable of connecting to the host computer 190 through a network 191. The printer controller 120 has an HDD interface (HDD I/F) 121, an input-output apparatus interface (input-output apparatus I/F) 122, a read-only memory (ROM) interface (ROM I/F) 125, and a memory controller 126. The printer controller 120 further has a host interface (host I/F) 127, a central process-ing unit (CPU) 128, an image processing unit 129, and a controller engine interface 130. These are connected to one another through a system bus 132.

The printer controller 120 further has a flash ROM 123 and a random-access memory (RAM) 124. The flash ROM 123 and the RAM 124 are connected to the system bus 132 via the ROM I/F 125 and the memory controller 126, respectively.

The CPU 128 is a central processing unit in the form of a microprocessor (microcomputer), and controls the opera-tion of the whole printer 100 by running programs and activating hardware. The flash ROM 123 stores the pro-grams to be run by the CPU 128 and fixed data necessary for various operations of the printer 100. The RAM 124 is, for example, used as a work area for the CPU 128 and an area to temporarily store various data received, and store various setting data.

The image processing unit 129 performs various kinds of image processing. For example, the image processing unit 129 performs a process of developing (converting) print data handled in the printer 100 (e.g., data represented in a page description language) into image data (bitmap image data), and other image processing. Moreover, the image processing unit 129 converts the color space of image data contained input print data (e.g., YCbCr) into a standard RGB color space (e.g., sRGB). Furthermore, the image processing unit 129 performs various kinds of image processing on the image data such as resolution conversion into an effective pixel count (a number with which the printer 100 can perform a print process), image analysis, and image correc-tion as necessary. The image data obtained by these kinds of image processing is then stored in the RAM 124 or the HDD 161.

The printer engine 150 includes the ink-jet head 151, a cutter unit 152, a conveyance motor 153, an interface 154, a wind-up motor 155, remaining ink amount sensors 156, a drying heater 158, a temperature sensor 159, and a humidity sensor 160. These are connected to one another through a system bus 157.

The ink-jet head 151 is a printing unit that performs image printing, and prints an image on a print medium based on image data. For example, the ink-jet head 151 holds multiple print heads for multiple colors, and forms an image on a print medium by ejecting inks in synchronization with the conveyance of the print medium.

The cutter unit 152 is a mechanism that cuts a print medium. For example, the cutter unit 152 cuts a print medium in a predetermined length after image printing. The conveyance motor 153 is a motor that drives a conveyance roller which conveys a print medium, and is controlled by the CPU 128. The printer engine 150 is connected to the printer controller 120 via the interface 154. The wind-up motor 155 is a motor that rotates the axial rod of a wind-up mechanism, which is a stacking apparatus, and is controlled by the CPU 128.

The remaining ink amount sensors 156 are disposed in ink tanks serving as supply sources of printing materials, and detect whether the respective inks are present at given points inside the ink tanks. The drying heater 158 dries the liquids or inks applied to a print medium. The temperature sensor 159 detects the temperature of the ink-jet head 151. The humidity sensor 160 detects the humidity around the ink-jet head 151. The input-output apparatus 162 includes hardware keys and a touch panel on which the user performs various operations, and a display unit which presents various infor-mation to the user (notifies the user of the various information). The input-output apparatus 162 can also present information to the user by outputting a sound (such as a buzzer or speech) based on sound information from an audio generator.

The HDD 161 is capable of storing and reading out programs to be run by the CPU 128, print data, and setting information necessary for various operations of the printer 100 in and out of the hard disks incorporated in the HHD 161. A large-capacity storage unit may be used instead of the HDD 161.

In the present embodiment, the printer 100 includes the input-output apparatus 162, but the present embodiment is not limited to this configuration. The input-output apparatus 162 may be provided outside the printer 100, in which case the input-output apparatus 162 may be connected to the printer 100 by wireless communication or the like. In another example, the host computer 190 may also serve as the input-output apparatus 162. Also, the printer 100 may be capable of connecting to another input-output apparatus through a network or the like, in addition to the input-output apparatus 162.

The host computer 190 is, for example, an external apparatus serving as a supply source of print data. Instead of the host computer 190, another supply source of print data, e.g, an image reader, a digital camera, or a smartphone, may be connected to the printer 100.

The present embodiment has been described by using the printer 100 as an example, which includes the ink-jet head 151 and performs printing by ejecting the inks from the ink-jet head 151. However, the present embodiment is not limited to this configuration. The printer simply needs to be any printer that prints an image on a print medium.

Figure 3:
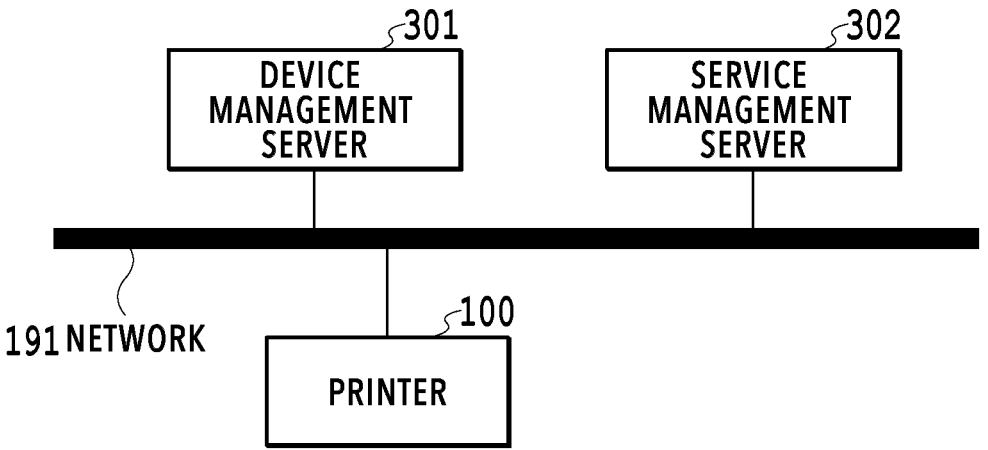
FIG. 3 is a block diagram illustrating an entire configuration of a system to which the printer is connected.

FIG. 3 is a block diagram illustrating an entire configu-ration of a system to which the printer 100 in the present embodiment is connected. This system includes the printer 100 as a printing apparatus, a device management server 301, and a service management server 302 communicatively connected to one another through the network 191, such as the Internet. The device management server 301 and the service management server 302 are devices for managing subscription contracts of printers connected to the network 191. In the present embodiment, the printer 100 can be used by its user under a subscription contract.

The printer 100 receives contract information from the device management server 301. The contract information includes the number of pages available for printing with no additional fee in a particular period based on the contract (such as every month), and the like. Then, the printer 100 records the contract information in its flash ROM 123, and controls print operations and the like according to the recorded contract information. In the following, the number of pages the printer 100 can print with no additional fee in a particular period according to this contract information will be referred to as "printable page count." The device management server 301 holds contract information notified of from the service management server 302 and, based on this, provides contract information to the printer 100.

A communication protocol such as Hypertext Transfer Protocol (hereinafter HTTP) is used for the communication between the printer 100 and the device management server 301 and service management server 302, and a publicly known control method is used to control the communication. The device management server 301 is interposed between the printer 100 and the service management server 302, but the present embodiment is not limited to this configuration. For example, the configuration may be such that contract information is directly passed between the printer 100 and the service management server 302 through the Internet. Control of the printer 100 performed according to contract information will be described later in detail.

FIG. 4 is a diagram illustrating a communication sequence between the servers (device management server 301 and service management server 302), the printer 100, and a user 300 (terminal) according to the present embodiment. In the following, a sequence from contracting for a service to authenticating the service for the printer 100 in the present embodiment will be described using FIG. 4. Of the series of processes illustrated in FIG. 4, the CPU 128 of the printer 100 performs the processes at the printer 100 by loading program code stored in the flash ROM 123 to the RAM 124 and executing it. The CPU of the device management server 301 performs the processes at the device management server 301 by loading program code stored in the ROM of the device management server 301 to its RAM and executing it. The CPU of the service management server 302 performs the processes at the service management server 302 by loading program code stored in the ROM of the service management server 302 to its RAM and executing it. The user 300 is a terminal used by the user, such as a smartphone, for example. The CPU of the terminal performs each process under instructions from the user. The functions of some or all of the steps by each device in FIG. 4 may be implemented with hardware such as an application-specific integrated circuit (ASIC) or an electronic circuit. Meanwhile, the symbol "S" in the description of each process means a step in the flowchart.

This communication sequence is implemented between the printer 100, the device management server 301, and the service management server 302 in a case where the user contracts for a service for the printer 100 by using a terminal, such as a smartphone. In FIG. 4, the terminal, such as a smartphone, used by the user is illustrated as the user 300.

In S401 in FIG. 4, the user 300 contracts for the service on an application that manage services. In response to the user 300 contracting for the service, the service management server 302 performs a service registration process in S402 in which user information and the printer 100 to be registered are associated with each other. After the service registration process, the service management server 302 notifies the user 300 in S403 that a contract has been made, and a printer will be delivered to the user. In response to this, a service contractor delivers the printer 100 registered in S402 to a location designated by the user. Receiving the printer 100, the user unpacks the printer 100 and starts an initial installation process in S404. In S405, the printer 100 is instructed by the user 300 to proceed with the initial installation process, which involves configuring network settings for connecting to the Internet, and so on.

After a network connection is established by the initial installation process, the printer 100 issues a device registration request to the device management server 301 in S406 along with the printer's identification information such as its product serial number. In response to receiving the device registration request, the device management server 301 performs a registration process in S407 based on the identification information received from the printer 100. After the registration process, the device management server 301 returns the result of the registration to the printer 100 (dashed arrow) while also notifying the service management server 302 of the completion of the device registration in S408. It is possible to employ a configuration in which this notification of the service management server 302 with the completion of the device registration is performed for each of multiple service management servers 302 responsible for respective services.

In response to the device registration completion notification from the device management server 301, the service management server 302 refers to the identification information of the printer 100 received at that time and notifies the device management server 301 of contract information of each associated service in S409. Then, in S410, the device management server 301 holds the contract information notified of by the service management server 302 in the device management server 301. Thereafter, in S411, the printer 100 requests the contract information, and the device management server 301 in turn notifies the printer 100 of the contract information of each service held therein in an HTTP response (dashed arrow). This obtaining of the contract information is to issue a request to collectively obtain the contract statuses of multiple services, and is not communication individually performed for each service.

In response to receiving the contract information of the multiple services from the device management server 301, the printer 100 stores the contract information of each service and reflects the content of each contract in the subsequent printer control in S412. For example, if confirming that a contract has been made for a service, the printer 100 enables the printer's function related to that service which has been restricted (S412) to make the function available to the user. The present embodiment is an example in which the printer 100 is provided on the assumption that the user 300 has contracted for the service, and the basic functions of the printer 100 such as its print function, scan function, and copy function are all restricted until it is confirmed that a contract has been made for the service in S411. Then, receiving a response to S411 from the device management server 301, the printer 100 enables those restricted functions, so that the functions become available. Thereafter, each time printing is performed, the printer 100 notifies the device management server 301 of the number of pages printed (S413). The device management server 301 in turn notifies the printer 100 of the remaining printable page count as a response (obtaining higher limit information) (dashed line arrow).

Then, in a case where the remaining printable page count becomes low (the remaining printable page count falls below a predetermined value), the device management server 301 notifies the printer 100 of a warning (S414). The printer 100 holds the warning.

Incidentally, the printer 100 may be configured to determine when to make a warning based on the printable page count notified of by the device management server 301, and hold the warning.

The communication sequence illustrated in FIG. 4 ends as above. After the warning is made, the printer 100, the device management server 301, or the service management server 302 notifies the user 300 of a possibility of being charged an additional fee in a case of printing more than the printable page count. In this way, the user can realize that the remaining printable page count has become low. The user then decides whether to pay the additional fee. Thereafter, whether to execute or prohibit printing is decided based on the user's decision.

FIG. 5 is a block diagram illustrating a control configuration of the printer 100 in the present embodiment. A printing prohibition unit 501 determines whether to prohibit printing before execution of the printing (details will be described later). A communication state determination unit 502 determines whether the printer is online, that is, whether

US 12,693,815 B2

Figure 4:
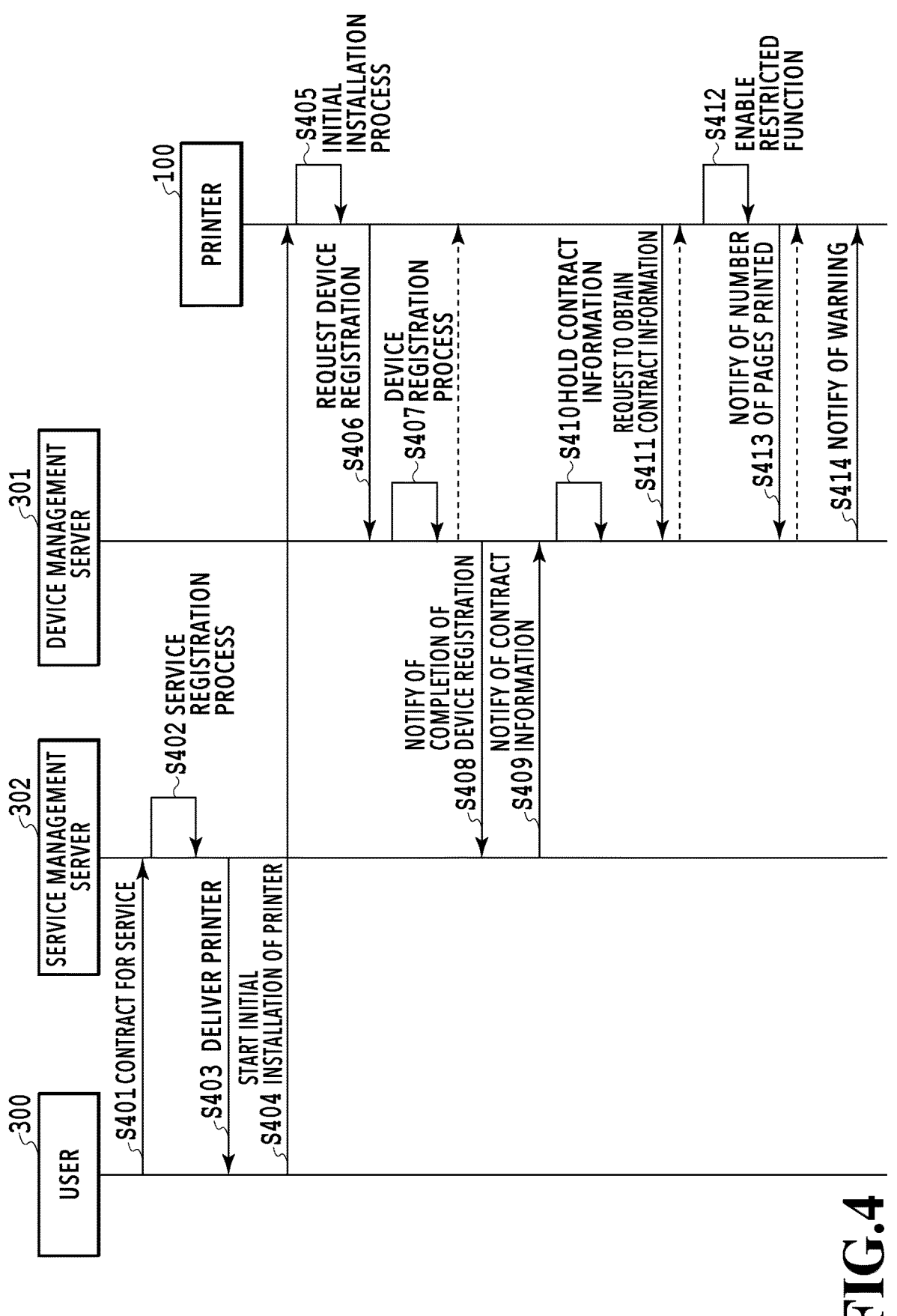
FIG. 4 is a diagram illustrating a communication sequence between a server and the printer.
Figure 5:
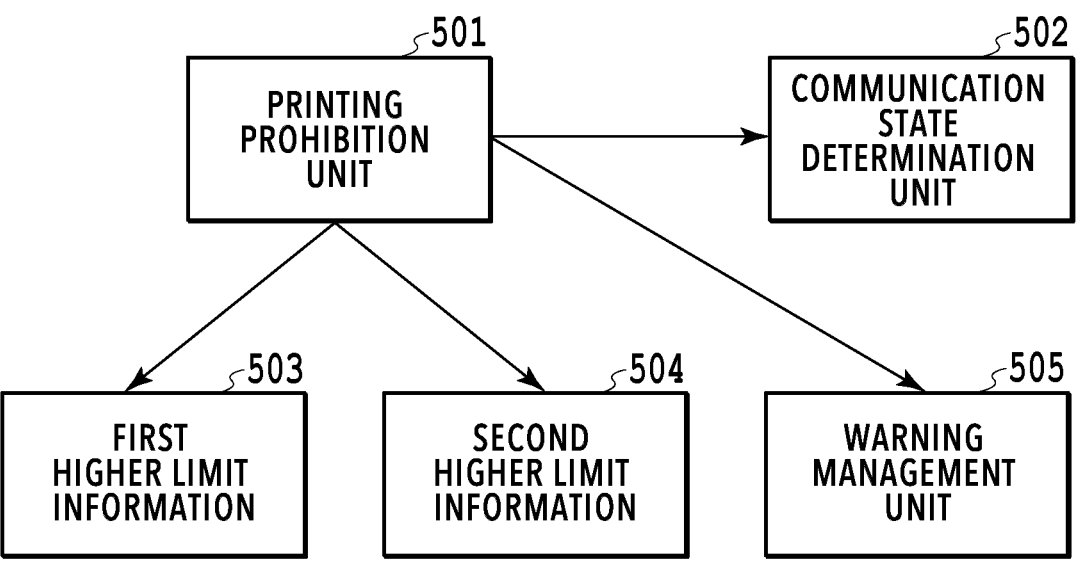
FIG. 5 is a block diagram illustrating a configuration of a control unit of the printer.

7 the printer is now able to send and receive information necessary for a service such as the contract information and the printed page count to and from the device management server 301. First higher limit information 503 is information indicating the remaining printable page count. Each time a print job is executed, the first higher limit information 503 is obtained as the response to S413 in the communication sequence in FIG. 4, and the corresponding memory in the printer 100 is overwritten with the obtained first higher limit information 503. Second higher limit information 504 is information on the higher limit of the number of pages available for printing in a case where the communication state determination unit 502 determines that the printer 100 is unable to communicate, i.e., offline. The second higher limit information 504 may be obtained as a part of the contract information from the device management server 301, or set to a predetermined value by the printer 100. The second higher limit information 504 is a fixed value, and the first higher limit information 503 and the second higher limit information 504 are managed independently of each other.

A warning management unit 505 holds information on whether the above-described warning on the printable page count has been made. The device management server 301 may notify the printer 100 of the warning, as in S413 in the communication sequence in FIG. 4, or the printer 100 may make the warning based on the printable page count notified of by the device management server 301. When the remaining printable page count is reset, e.g., when the month changes, the warning management unit 505 deletes "information indicating the warning have been made" which has been held in the preceding period according to the contract information. The warning management unit 505 may overwrite the information with information indicating no warning has been made, and hold this information.

The printing prohibition unit 501 determines whether to execute or prohibit printing based on the information obtained from the communication state determination unit 502, the first higher limit information 503, the second higher limit information 504, and the warning management unit 505 described above.

Figure 6:
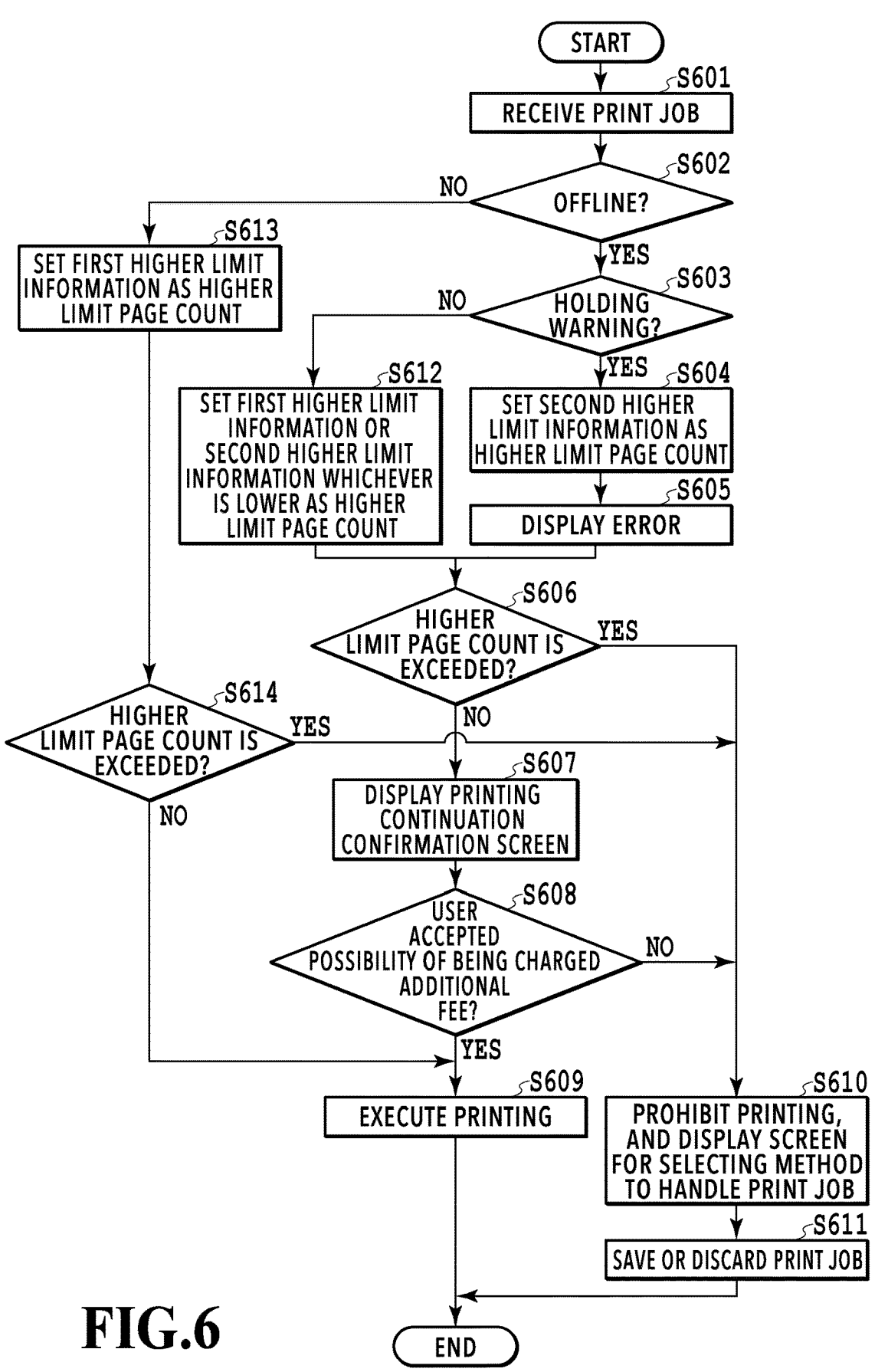
FIG. 6 is a flowchart illustrating a print process in the printer.

FIG. 6 is a flowchart illustrating a print process in the printer 100 in the present embodiment. The print process in the printer 100 in the present embodiment will be described below using this flowchart. The CPU 128 of the printer 100 performs the series of processes illustrated in FIG. 6 by loading program code stored in the flash ROM 123 to the RAM 124 and executing it. This flowchart starts in response to input of a print job into the printer 100 from the host computer 190 (see FIG. 1) or the like.

In S601, the CPU 128 receives the print job. In response to receiving the print job, the CPU 128 determines in S602 whether the printer 100 is offline with the communication state determination unit 502.

If determining in S602 that the printer 100 is not offline, the CPU 128 proceeds to S613 to set the currently held first higher limit information 503 as the higher limit page count. The CPU 128 then proceeds to S614 to compare the expected printed page count for the print job received in S601 and the higher limit page count set in S613. If the expected printed page count does not exceed the higher limit page count, the CPU 128 proceeds to S609 to execute printing for the print job received in S601, and terminates the process. At this time, the CPU 128 notifies the device management server 301 of the number of pages printed in this print operation (S412 in FIG. 4).

If, on the other hand, determining in S602 that the printer 100 is offline, the CPU 128 determines in S603 whether the warning management unit 505 is holding the warning (whether the warning is present) at this point. If the warning management unit 505 is holding the warning, the CPU 128 proceeds to S604 to set the second higher limit information 504, which has been held in advance, as the higher limit page count. Then, in S605, the CPU 128 then displays an error to indicate to the user that this print operation may increase the printed page count beyond the higher limit. If the warning management unit 505 is holding no warning in S603, the CPU 128 proceeds to S612 to set the first higher limit information or the second higher limit information whichever has a lower value as the higher limit page count. Then, the CPU 128 proceeds to S606.

In S606, the CPU 128 compares the expected printed page count for the print job received in S601 and the higher limit page count set in S604 or S612. Then, the CPU 128 determines whether the expected printed page count has exceeded the higher limit page count (the first higher limit information 503 or the second higher limit information 504), and proceeds to S607 if the expected printed page count has not exceeded the higher limit page count. In S607, the CPU 128 displays a screen for confirming with the user whether to continue the printing. Here, the printing continuation confirmation screen is intended to confirm with the user whether to accept a possibility of being charged an additional fee. Thus, on this user confirmation screen, the user's intention may be confirmed, for example, after the user is successfully authenticated using a user authentication unit in order to identify whether the user is a person who has the authority to make a decision. Thereafter, in S608, the CPU 128 determines whether the user has accepted the possibility of being charged an additional fee. If the user accepts the possibility of being charged an additional fee, the CPU 128 proceeds to S609 to execute printing for the print job received in S601, and the terminates the process.

If, on the other hand, determining in S606 or S614 that the expected printed page count has exceeded the higher limit page count, or determining in S608 that the user has not accepted the possibility of being charged an additional fee, the CPU 128 proceeds to S610 to prohibit printing for the print job received in S601. Moreover, the CPU 128 displays a screen for having the user choose to save the received print job or to discard it. Then, in S611, the CPU 128 saves or discards the print job based on the user's decision, and terminates the process.

In the example described in the present embodiment, the user is charged an additional fee in a case where a higher limit page count based on contract information is exceeded. However, the present embodiment is not limited to this example. Simply, printing may be prohibited in the case where the higher limit page count is exceeded.

As described above, in the present embodiment, if the warning is given in a case where the printer is offline and is to perform printing, the printing is prohibited. In this way, it is possible to provide a printer, a method of controlling a printer, and a storage medium which are capable of keeping a user from unintentionally printing pages more than a higher limit page count.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above- described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-013591 filed Jan. 31, 2023, which is hereby incorporated by reference wherein herein in its entirety.

What is claimed is:

1. A printer capable of being used under a predetermined contract by communicating with a server, the printer comprising:

at least one processor and at least one memory containing instructions to be executed by the at least one processor to function as:

a determination unit that determines whether the printer is in a state of being capable of communicating with the server;

a management unit that manages information indicating that a warning has been made, the printer being notified of the warning in a case where a remaining printable page count in a particular period determined based on the predetermined contract falls below a predetermined value;

a decision unit that decides whether to execute or prohibit a print operation corresponding to an input print job, wherein the decision unit prohibits the print operation corresponding to the print job in a case where (a) the determination unit determines that the printer is not in the state of being capable of communicating with the server, (b) the management unit is holding the information indicating that the warning has been made, (c) a page count corresponding to the print job does not exceed the remaining printable page count or a limit page count when the printer is in a state of being capable of communicating with the server, and (d) a user does not accept possibility of being charged an additional fee;

a display unit that displays a screen for receiving a user operation to select saving the input print job or discarding the input print job in a case where the decision unit decides to prohibit the print operation; and an execution unit that saves the input print job or discards the input print job based on the user operation on the screen.

2. The printer according to claim 1, wherein the decision unit compares an expected printed page count for the print job and a predetermined higher limit page count, and decides to execute the print operation in a case where the expected printed page count has not exceeded the higher limit page count.

3. The printer according to claim 2, wherein the instructions are further executed to function as a first higher limit information obtaining unit that obtains the remaining printable page count as first higher limit information each time the printer performs a print operation in the state of being capable of communicating with the server, wherein the decision unit sets the first higher limit information as the higher limit page count in a case where the determination unit determines that the printer is in the state of being capable of communicating with the server, the decision unit sets second higher limit information, which is a fixed value, as the higher limit page count in a case where the determination unit determines that the printer is not in the state of being capable of communicating with the server, and the management unit is holding the information indicating the warning has been made, and the decision unit sets the first higher limit information or the second higher limit information whichever has a smaller value as the higher limit page count in a case where the determination unit determines that the printer is not in the state of being capable of communicating with the server, and the management unit is not holding the information indicating the warning has been made.

4. The printer according to claim 1, wherein the instructions are further executed to function as a confirmation unit that confirms with a user whether to accept additional charge in a case where the management unit is holding the information indicating that the warning has been made, and the decision unit has decided to execute the print operation, wherein the decision unit prohibits the print operation in a case where the confirmation unit confirms that the user does not accept the additional charge.

5. The printer according to claim 4, wherein the instructions are further executed to function as an authentication unit that performs user authentication, wherein the confirmation unit confirms an intention of a user after the user is successfully authenticated by the authentication unit.

6. The printer according to claim 1, wherein the instructions are further executed to function as a selection unit that allows a user to select a method of handling the input print job in a case where the decision unit decides to prohibit the print operation.

7. The printer according to claim 6, wherein the method is to save or discard the print job.

8. The printer according to claim 1, wherein the management unit deletes the held information indicating the warning has been made in a case where the remaining printable page count is reset based on the particular period determined based on the predetermined contract.

9. A method of controlling a printer capable of being used under a predetermined contract by communicating with a server, the method comprising:

determining whether the printer is in a state of being capable of communicating with the server;

confirming whether information indicating that a warning has been made is present, the printer being notified of the warning in a case where a remaining printable page count in a particular period determined based on the predetermined contract falls below a predetermined value;

prohibiting a print operation corresponding to an input print job in a case of (a) determining that the printer is not in the state of being capable of communicating with the server, (b) confirming the presence of the information indicating that the warning has been made, (c) a page count corresponding to the print job not exceeding the remaining printable page count or a limit page count when the printer is in a state of being capable of communicating with the server, and (d) a user not accepting possibility of being charged an additional fee;

displaying a screen for receiving a user operation to select saving the input print job or discarding the input print job in a case where the decision unit decides to prohibit the print operation; and saving the input print job or discarding the input print job based on the user operation on the screen.

10. A non-transitory computer-readable storage medium storing a program for controlling a printer capable of being used under a predetermined contract by communicating with a server, the program comprising:

determining whether the printer is in a state of being capable of communicating with the server;

confirming whether information indicating that a warning has been made is present, the printer being notified of the warning in a case where a remaining printable page count in a particular period determined based on the predetermined contract falls below a predetermined value;

prohibiting a print operation corresponding to an input print job in a case of (a) determining that the printer is not in the state of being capable of communicating with the server, (b) confirming the presence of the information indicating that the warning has been made, (c) a page count corresponding to the print job not exceeding the remaining printable page count or a limit page count when the printer is in a state of being capable of communicating with the server, and (d) a user not accepting possibility of being charged an additional fee;

displaying a screen for receiving a user operation to select saving the input print job or discarding the input print job in a case where the decision unit decides to prohibit the print operation; and saving the input print job or discarding the input print job based on the user operation on the screen.

* * * * *